United States Patent
Mori et al.

[11] Patent Number: 5,169,419
[45] Date of Patent: Dec. 8, 1992

[54] GAS ADSORBER FOR EXHAUST GAS

[75] Inventors: Yoichi Mori; Akira Fukunaga, both of Fujisawa, Japan

[73] Assignee: Ebara Corporation, Tokyo, Japan

[21] Appl. No.: 813,693

[22] Filed: Dec. 27, 1991

[30] Foreign Application Priority Data

Jan. 18, 1991 [JP] Japan ................................. 3-16746

[51] Int. Cl.[5] ............................................. B01D 53/04
[52] U.S. Cl. ............................................ 55/274; 55/387
[58] Field of Search .................. 55/179, 274, 275, 387

[56] References Cited

U.S. PATENT DOCUMENTS

| 3,773,044 | 11/1973 | Wallace | 55/275 X |
|---|---|---|---|
| 3,897,226 | 7/1975 | Doherty | 55/33 |
| 3,976,050 | 8/1976 | Glasser et al. | 55/274 X |
| 4,095,965 | 6/1978 | Neumann et al. | 55/275 X |
| 4,197,098 | 4/1980 | Stiehl et al. | 55/274 X |
| 4,278,453 | 7/1981 | Klein | 55/275 |
| 4,516,988 | 5/1985 | Winter | 55/59 |
| 4,999,035 | 3/1991 | Warndorf | 55/275 |

FOREIGN PATENT DOCUMENTS

| 0261950 | 3/1988 | European Pat. Off. | |
|---|---|---|---|
| 2718218 | 11/1978 | Fed. Rep. of Germany | 55/274 |
| 3225674 | 1/1984 | Fed. Rep. of Germany | 55/274 |
| 1073174 | 9/1954 | France | |
| 2333557 | 7/1977 | France | 55/274 |
| 61-239162 | 10/1986 | Japan | |
| 62-123234 | 8/1987 | Japan | |
| WO91/06362 | 5/1991 | PCT Int'l Appl. | |

Primary Examiner—Robert Spitzer
Attorney, Agent, or Firm—Oblon, Spivak, McClelland, Maier & Neustadt

[57] ABSTRACT

A gas adsorber which is capable of reliably removing harmful gases discharged from processes in the semiconductor industry, the ceramic industry, etc. The gas adsorber has an integral structure comprising a main treating section having an exhaust gas inlet port and packed with an adsorbent, an auxiliary treating section having a treated gas outlet port and packed with an adsorbent, and a space section provided in between the main and auxiliary treating sections, the space section having a gas outlet port and a gas return port, which provide communication between the space section and a gas sensor. With this arrangement, the adsorption conditions in the main treating section can be perceived accurately.

7 Claims, 2 Drawing Sheets

GAS ADSORBER FOR EXHAUST GAS

BACKGROUND OF THE INVENTION

The present invention relates to a gas adsorber and, more particularly, to an adsorber which is suitable for use in processing systems that pretreat adsorptively waste gases containing mainly harmful gases, including those discharged from processes in the semiconductor industry, the ceramic industry, etc. to remove harmful components therefrom before the waste gases are released from the systems.

To pretreat harmful waste gases from semiconductor manufacturing processes and the like by an adsorption method, the following supervisory requirements must be satisfied: First, it is necessary to employ a means for accurately detecting the breakthrough point of the adsorbent used. Secondly, it is necessary to take measures to prevent harmful components from leaking out from the adsorber while the process is suspended until the adsorbent is replaced with a new one after the detection of the breakthrough point.

As an apparatus that satisfies these requirements to a certain extent, a treating apparatus has been proposed (Japanese Utility Model Public Disclosure (KOKAI) No. 62-123234) which comprises a main treating section including a main treating chamber having a large capacity and packed with a treating agent and an indicator that indicates the treating capacity of the main treating chamber, and a sub-treating chamber having a capacity which is about one tenth of that of the main treating chamber, the sub-treating chamber being connected in series to the main treating section at the downstream side thereof, so that waste gas flowing out from the main treating section is treated in the sub-treating chamber in supplementary manner.

However, the prior art cannot completely satisfy the above-described requirements in regard to the following points:

Although the change in color of the indicator is adopted as a means for detecting the breakthrough point of the adsorbent, which is the first requirement, the breakthrough of the adsorbent cannot be known before it occurs unless the indicator is constantly monitored, and it is impossible to know how long a harmful gas has flowed into the sub-treating chamber from the main treating chamber at the time when the operator becomes aware of a change in the color of the indicator and also impossible to know the concentration of the harmful gas. In consequence, the level of load on the post-stage sub-treating chamber cannot exactly be known, and there may be cases where the harmful gas leaks out from the sub-treating chamber, resulting in a failure to satisfy the second requirement. It is necessary in order to avoid such a problem to increase the size of the sub-treating chamber so that it has a sufficiently large treating capacity. However, such a solution merely results in an increase in the overall size of the apparatus and cannot satisfy the second requirement since it is still impossible to control the concentration of the gas flowing into the sub-treating chamber. In addition, the larger the surplus of the treating capacity of the sub-treating chamber, the larger the amount of adsorbent remaining unused in the sub-treating chamber when it is replaced, which is extremely uneconomical.

The detection method that utilizes a change in color of the indicator involves the problem that a coexisting component may cause the indicator to fade or shade after it has changed color, thus making it difficult to detect the breakthrough point. In such a case, the sub-treating chamber cannot serve to attain the original object.

Further, in the prior art the main treating section and the sub-treating chamber, which are provided separately from each other, are connected together through a valve so that waste gas can be supplied directly to the sub-treating chamber through a bypass while the adsorbent in the main treating chamber is being replaced. With such an arrangement, however, gas is constantly flowing into the sub-treating chamber, so that the adsorbent in the sub-treating chamber can be replaced only after the suspension of the operation of the factory. Nevertheless, it is impossible to know the amount of harmful gas which has already flowed into the sub-treating chamber, as described above. Therefore, the process may invite such a situation that the treating agent in the sub-treating chamber which should be replaced is used until the operation of the factory is suspended, resulting in an incomplete treatment. Moreover, when the waste gas that bypasses the main treating section is treated in the sub-treating chamber only, the sub-treating chamber must treat a harmful gas of high concentration for a time longer than a predetermined period, although it is usually only required to treat a relatively small amount of harmful gas leaking out from the main treating section. Therefore, if the flow rate of waste gas or the content of harmful components is excessively high, the sub-treating chamber, which has a treating capacity that is about one tenth of that of the main treating chamber, may fail to treat the waste gas completely.

Thus, the prior art lacks reliability in the means for detecting a breakthrough in the main treating section and cannot control the concentration of the waste gas leaking out from the main treating section after the detection of the breakthrough. Accordingly, the sub-treating chamber, which is additionally installed, cannot serve to attain the original object, and moreover, no consideration has been given to the method of controlling the sub-treating chamber, which is essential. In consequence, there is a probability of harmful components leaking out to the downstream side of the adsorber.

SUMMARY OF THE INVENTION

In view of the above-described circumstances, it is an object of the present invention to provide an adsorber which is designed so that the treating conditions in a main treating section can be detected reliably, and no harmful gas is allowed to leak out from an auxiliary treating section in excess of a permissible level, and yet the whole system can be controlled even more safely and economically.

To attain the above-described object, the present invention provides a gas adsorber for exhaust gas which has an integral structure comprising a main treating section having an exhaust gas inlet port and packed with an adsorbent, an auxiliary treating section having a treated gas outlet port and packed with an adsorbent, and a space section provided in between the main and auxiliary treating sections, the space section having a gas takeout port and a gas return port, which provide communication between the space section and a gas sensor. In addition, the gas passing through the main treating section is taken out from the gas takeout port of the space section by a suction pump so as to be supplied to the gas sensor, and the gas that has been supplied to the gas sensor for the purpose of detection is returned to the adsorber through the gas return port of the space section, thereby enabling detection of a breakthrough of the adsorbent in the main treating section.

According to the present invention, the main treating section, the space section and the auxiliary treating section are arranged in an integral structure to pretreat a harmful waste gas, and the space section is provided with a gas takeout port and a gas return port, thereby making it possible to collect the treated gas in the main treating section and also possible to replace the adsorbents in the main and auxiliary treating sections simultaneously. In addition, the treated gas in the main treating section is taken out from the gas takeout port by a suction pump so as to be supplied to a gas sensor, thereby enabling the concentration of the treated gas in the main treating section to be monitored at all times, and thus permitting control of the treating conditions in the main and auxiliary treating sections. It should be noted that the gas that has been supplied to the gas sensor for the purpose of detection is returned to the gas return port of the space section so as to pass through the auxiliary treating section, thereby enabling substances which may disturb the surroundings to be reduced in amount to a level below a maximum allowable concentration throughout the whole system including treatment and detection at all times.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DETAILED DESCRIPTION OF THE PREFERRED EMBODIMENTS:

Embodiments of the present invention will be described below with reference to the accompanying drawings. It should be noted that the present invention is not necessarily limited to these embodiments.

Figure 1:
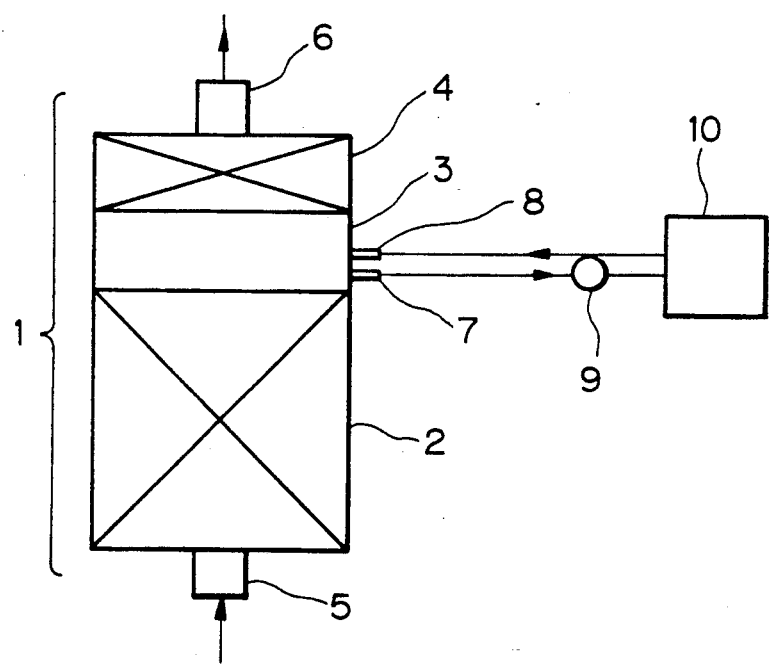
FIG. 1 is a schematic view illustrating one embodiment of the gas adsorber according to the present invention.

Referring first to FIG. 1, which schematically illustrates one embodiment of the gas adsorber according to the present invention, an adsorber 1 has an integral structure comprising a main treating section 2, a space section 3, and an auxiliary treating section 4. The main treating section 2 has an exhaust gas inlet port 5, while the auxiliary treating section 4 has a treated gas outlet port 6, and the space section 3 has a gas takeout port 7 and a gas return port 8 so that the treated gas in the main treating section 2 is taken out from the gas takeout port 7 by a suction pump 9 so as to be supplied to a gas sensor 10 where the concentration of the gas is detected, and thereafter the gas is returned to the adsorber 1 through the gas return port 8.

Exhaust gas is first introduced into the main treating section 2 where harmful components are adsorbed on an adsorbent with which the main treating section 2 is packed. As to the adsorbent, a suitable one may be selected from among physical adsorbents and chemical adsorbents according to the kind of harmful component contained in the exhaust gas. The amount of adsorbent used is determined by the flow rate of gas discharged from the relevant process and the treating period of time required.

Since the space section 3 is provided with the gas takeout port 7 and the gas return port 8, the treated gas in the main treating section 2 can be properly collected from the gas takeout port 7 for analysis made to check the treating conditions in the main treating section 2. If part of the treated gas in the main treating section 2 is continuously taken out from the gas takeout port 7 through the suction pump 9 so as to be supplied to the gas sensor 10 to thereby monitor the gas concentration at all times, as shown in this embodiment, the treating conditions in the main treating section 2 can be controlled accurately, so that a pretreatment of waste gas can be effected with high reliability. As to the gas sensor 10, a sensor which effectively detects a harmful component which leaks out from the main treating section 2 first is selected, as a general rule, according to the composition of the waste gas and the characteristics of the adsorbent from among gas sensors such as electrochemical sensors, semiconductor sensors, heat conductivity sensors, etc., sensors using test paper and so forth. It should be noted that these sensors can output an electric signal in accordance with the gas concentration, so that if an alarm is given when a breakthrough occurs, the operator can notice it without fail, and it is also possible to obtain the load of gas flowing into the auxiliary treating section 4 by recording the gas concentration after the occurrence of the breakthrough. It should be noted that the gas that has been subjected to the detection is returned to the adsorber 1 through the gas return port 8 of the space section 3 because harmful components may remain in the gas after the detection in the case of using the gas sensor 10.

Harmful components leaking into the space section 3 from the main treating section 2 after the detection of the end point of the main treating section 2 are adsorbed on the adsorbent with which the auxiliary treating section 4 is packed. There is therefore no danger of harmful components leaking out of the system immediately. As to the adsorbent used in the auxiliary treating section 4, any kind of adsorbent which can effectively treat a harmful component which leaks out from the main treating section 2 first, as a general rule. It does not necessarily need to be the same as that used in the main treating section 2.

The amount of adsorbent used is determined by taking into consideration the time elapsed from the moment the gas sensor 10 detects a leakage from the main treating section 2 until the use of gas in the relevant process stops to allow replacement of the adsorbent and the amount of harmful gas flowing into the auxiliary treating section 4 during this period because the adsorbents in the main and auxiliary treating sections are replaced simultaneously. In the case of a batch type low-pressure CVD system, for example, if each operation takes 3 hours, the time that the gas actually flows is about 1 hour of the total operating time, and the remaining 2 hours is consumed for raising temperature and other operation. In such a case, therefore, it is only necessary for the auxiliary treating section 4 to be capable of treating the gas leaking out from the main treating section 2 for at least one hour after the leakage is detected by the gas sensor 10. Since in actual practice the leakage from the main treating section 2 increases gradually, the absolute quantity of harmful gas to be treated in the auxiliary treating section 4 is very small in comparison to the quantity of gas treated in the main treating section 2. Therefore, the amount of adsorbent actually required in the auxiliary treating section 4 is about 1/50 to 1/25 of that in the main treating section 2.

Since the auxiliary treating section 4 is formed together with the main treating section 2 in an integral structure, the adsorbents in these sections are replaced simultaneously, so that it becomes unnecessary to control them separately and hence possible to prevent a mistake in mangagement.

Figure 2:
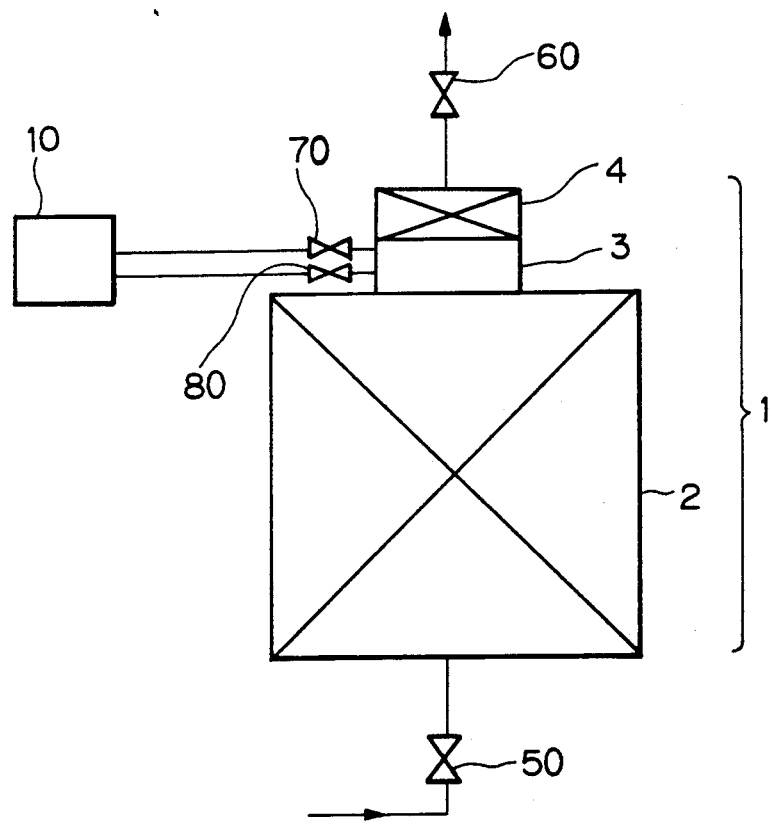
FIG. 2 is a schematic view illustrating another embodiment of the gas adsorber according to the present invention.

FIG. 2 is a schematic view illustrating another embodiment of the gas adsorber according to the present invention. The members shown in FIG. 2 are the same as those in FIG. 1 except that the ports 5, 6, 7 and 8 are illustrated as valves 50, 60, 70 and 80. In the arrangement shown in FIG. 2, however, the space section 3 and the auxiliary treating section 4 are reduced in size in comparison to the main treating section 2. These three sections may be arranged in an integral structure in this way. In the second embodiment, all the inlet and outlet ports are provided with respective valves.

Thus, according to the present invention, it is possible to treat a harmful gas safely and effectively while perceiving the treating conditions in the adsorber without leakage of harmful gas to the downstream side of the adsorber.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A gas adsorber for exhaust gas comprising:
    a main treating section having an exhaust gas inlet port and packed with an adsorbent;
    an auxiliary treating section having a treated gas outlet port and packed with an adsorbent;
    a gas sensor that indicates the concentration of a predetermined gas; and
    a space section provided in between said main treating section and said auxiliary treating section, said space section being in fluid communication with said main treating section and said auxiliary treating section, said space section being communicated with said gas sensor through a gas takeout port and a gas return port.

2. A gas adsorber according to claim 1, wherein said gas sensor outputs an electric signal in accordance with the concentration of a predetermined gas.

3. A gas adsorber according to claim 2, wherein an alarm is given when a breakthrough of the adsorbent in said main treating section occurs by use of the electric signal from said gas sensor.

4. A gas adsorber according to claim 2, wherein the load of gas flowing into said auxiliary treating section is obtained by recording the gas concentration after the occurrence of a breakthrough of the adsorbent in the main treating section by use of the electric signal from said gas sensor.

5. A gas adsorber according to claim 1, further comprising a suction pump disposed in between said gas takeout port and said gas sensor.

6. A gas adsorber according to claim 1, wherein said adsorbent with which said auxiliary treating section is packed is capable of treating a harmful component that leaks out from said main treating section first.

7. A gas adsorber according to claim 1, wherein said main treating section and said auxiliary treating section are arranged in an integral structure and the adsorbents in these sections are replaced simultaneously.

* * * * *